US010738754B2

(12) United States Patent
Smith et al.

(10) Patent No.: US 10,738,754 B2
(45) Date of Patent: Aug. 11, 2020

(54) RAPID SAMPLE IGNITION TEST SYSTEM

(71) Applicant: The Boeing Company, Chicago, IL (US)

(72) Inventors: Carson A. Smith, Summerville, SC (US); Thomas D. Mitchum, Jr., North Charleston, SC (US); Philipp A. Boettcher, Philadelphia, PA (US); Eddie Kwon, Seattle, WA (US); Jason Damazo, Seattle, WA (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 15/715,848

(22) Filed: Sep. 26, 2017

(65) Prior Publication Data

US 2019/0093622 A1    Mar. 28, 2019

(51) Int. Cl.
*F02P 17/00* (2006.01)
*G01N 25/50* (2006.01)
*F23Q 23/00* (2006.01)

(52) U.S. Cl.
CPC ............ *F02P 17/00* (2013.01); *G01N 25/50* (2013.01); *F23Q 23/00* (2013.01)

(58) Field of Classification Search
CPC .......... F02P 17/00; F23Q 23/00; G01N 25/50; G01N 31/12; G01N 25/22
See application file for complete search history.

(56) References Cited

U.S. PATENT DOCUMENTS

| 3,578,756 | A |  | 5/1971  | Evans et al. |
| 3,987,661 | A |  | 10/1976 | Kamp et al. |
| 7,449,034 | B1 | * | 11/2008 | Mikkelsen ............... C10L 1/026 123/1 A |
| 2006/0234387 | A1 | * | 10/2006 | Schaeffer ............... G01N 25/28 436/143 |
| 2007/0044760 | A1 | * | 3/2007 | Biruduganti ............ F02B 43/00 123/406.45 |
| 2008/0267252 | A1 |  | 10/2008 | West et al. |
| 2008/0307906 | A1 | * | 12/2008 | Brady .................. G01R 31/008 73/865.6 |
| 2014/0083514 | A1 | * | 3/2014 | Ding .................... G05D 7/0647 137/12 |

FOREIGN PATENT DOCUMENTS

EP       2003458     12/2008

OTHER PUBLICATIONS

European Extended Search Report, European Application No. 18193833.3, dated Feb. 27, 2019.

* cited by examiner

*Primary Examiner* — Eric S. McCall
*Assistant Examiner* — Timothy P Graves
(74) *Attorney, Agent, or Firm* — Perman & Green LLP

(57) ABSTRACT

An ignition testing system including a test article testing chamber, and at least one gas mixture verification chamber being communicably coupled to the test article testing chamber and being configured to verify at least a content of a gas mixture content provided to the test article testing chamber.

21 Claims, 8 Drawing Sheets

RAPID SAMPLE IGNITION TEST SYSTEM

BACKGROUND

1. Field

The exemplary embodiments generally relate to ignition test systems and more particularly to verifying properties of a test environment of the ignition test system.

2. Brief Description of Related Developments

Generally, testing objects (e.g., a test sample) for incendivity entails performing a photographic indirect testing method or using a previously designed ignition fixture to perform direct testing. The photographic indirect testing method uses multiple cameras to photograph the test sample subjected to the direct lightning effects which are then manually scored or processed to determine if the amount of total visible light in the photographs are above an established threshold. One manifestation of the lightning direct effects is glow spots which are an indication of an exceeded threshold. A test sample exhibiting a glow spot is typically treated as a failure. In the direct testing of the test sample, the ignition fixture is an opaque fixture that is filled with a flammable air-fuel mixture, and sealed with a panel. The panel, with the test sample coupled thereto, is subjected to direct lightning effects and observed to determine whether ignition of the flammable air-fuel mixture took place.

These conventional methods generally are slow and cumbersome and present uncertainty in the results. These methods also generally fail to provide reliability of verification to ensure the flammability of the air-fuel mixture because visual observation of the ignition is difficult and may require constant manipulation of the cameras.

SUMMARY

Accordingly, apparatuses and methods, intended to address at least the above-identified concerns, would find utility.

The following is a non-exhaustive list of examples, which may or may not be claimed, of the subject matter according to the present disclosure.

One example of the subject matter according to the present disclosure relates to an ignition testing system including a test article testing chamber, and at least one gas mixture verification chamber being communicably coupled to the test article testing chamber and being configured to verify at least a content of a gas mixture content provided to the test article testing chamber.

Another example of the subject matter according to the present disclosure relates to an ignition testing system including a test article testing chamber, a first gas mixture verification chamber being communicably coupled to the test article testing chamber to provide a gas mixture to the test article testing chamber, and a second gas mixture verification chamber being communicably coupled to the test article testing chamber to receive the gas mixture from the test article testing chamber, wherein first gas mixture verification chamber and the second gas mixture verification chamber are configured to verify a test environment within the test article testing chamber.

Still another example of the subject matter according to the present disclosure relates to a method for ignition testing with an ignition testing system, the method including filling an interior volume of a test article testing chamber and at least one gas mixture verification chamber with a gas mixture, where the test article testing chamber is communicably coupled to the at least one gas mixture verification chamber so that the gas mixture flows from one of the test article testing chamber and the at least one gas mixture verification chamber to another one of the test article testing chamber and the at least one gas mixture verification chamber, sealing the interior volume of each of the test article testing chamber and the at least one gas mixture verification chamber from the interior volume of each other one of the test article testing chamber and the at least one gas mixture verification chamber, and validating, with the at least one gas mixture verification chamber, a test environment within the test article testing chamber.

BRIEF DESCRIPTION OF THE DRAWINGS

Figure 1:
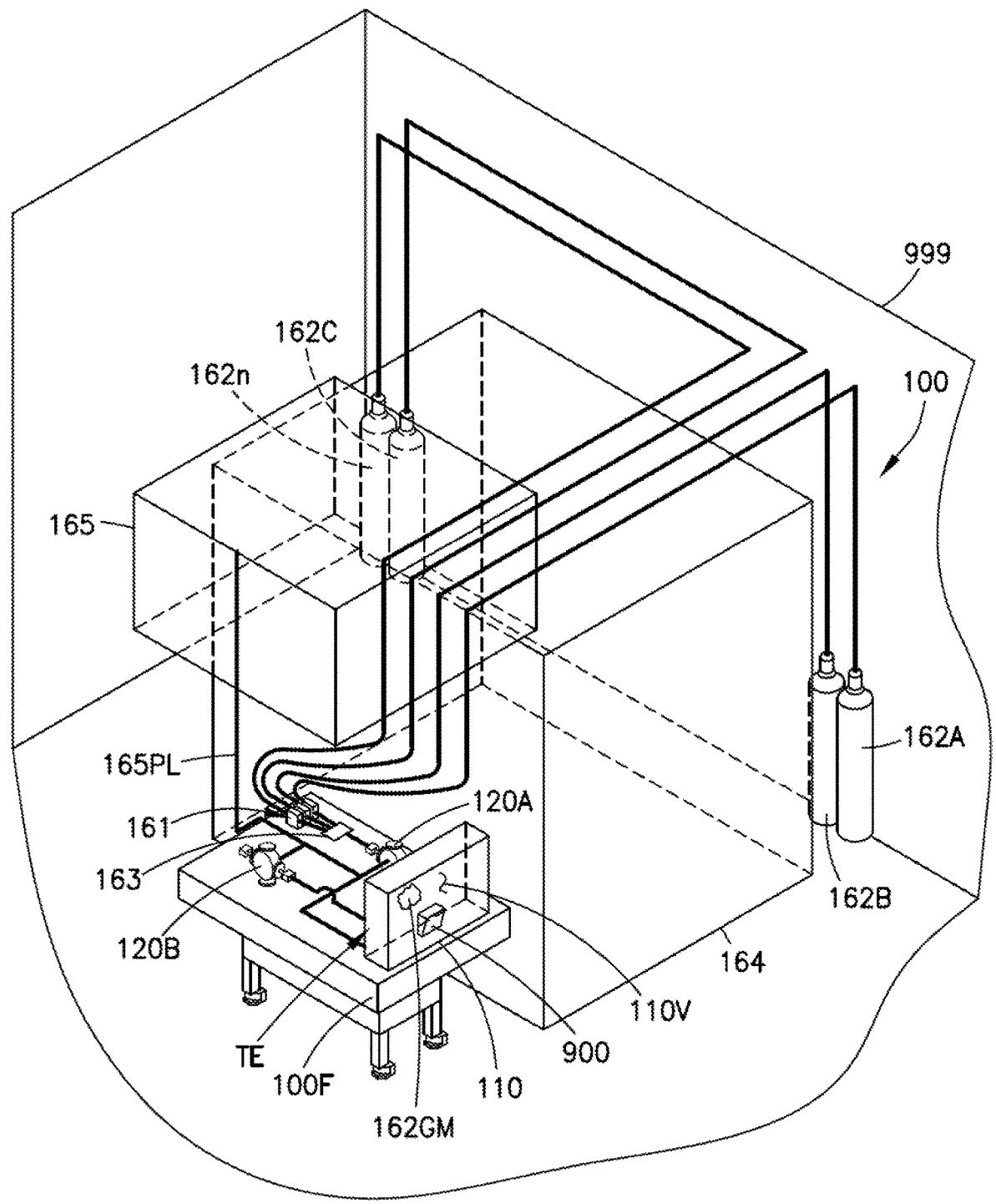
Figure 2A:
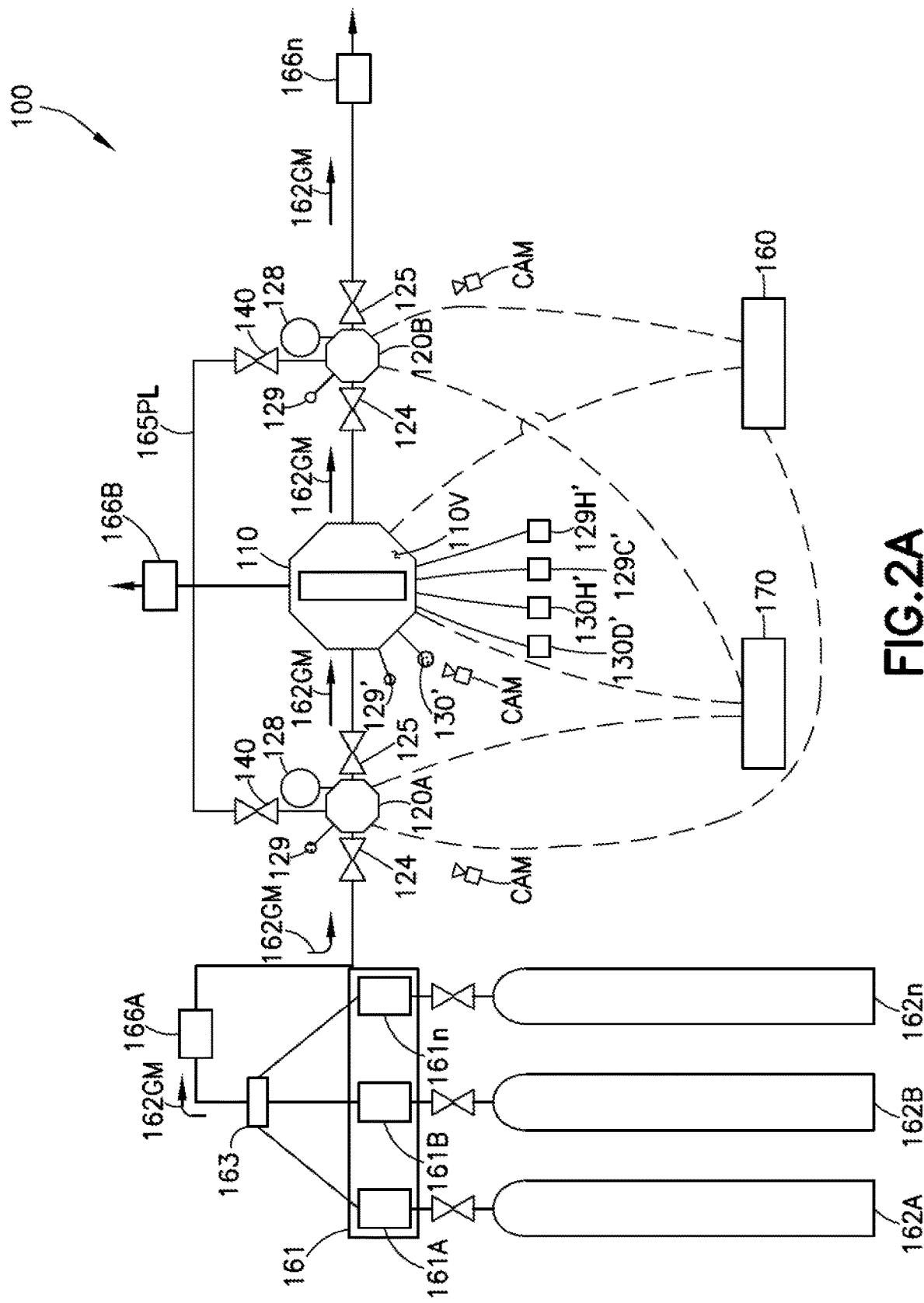
Figure 2B:
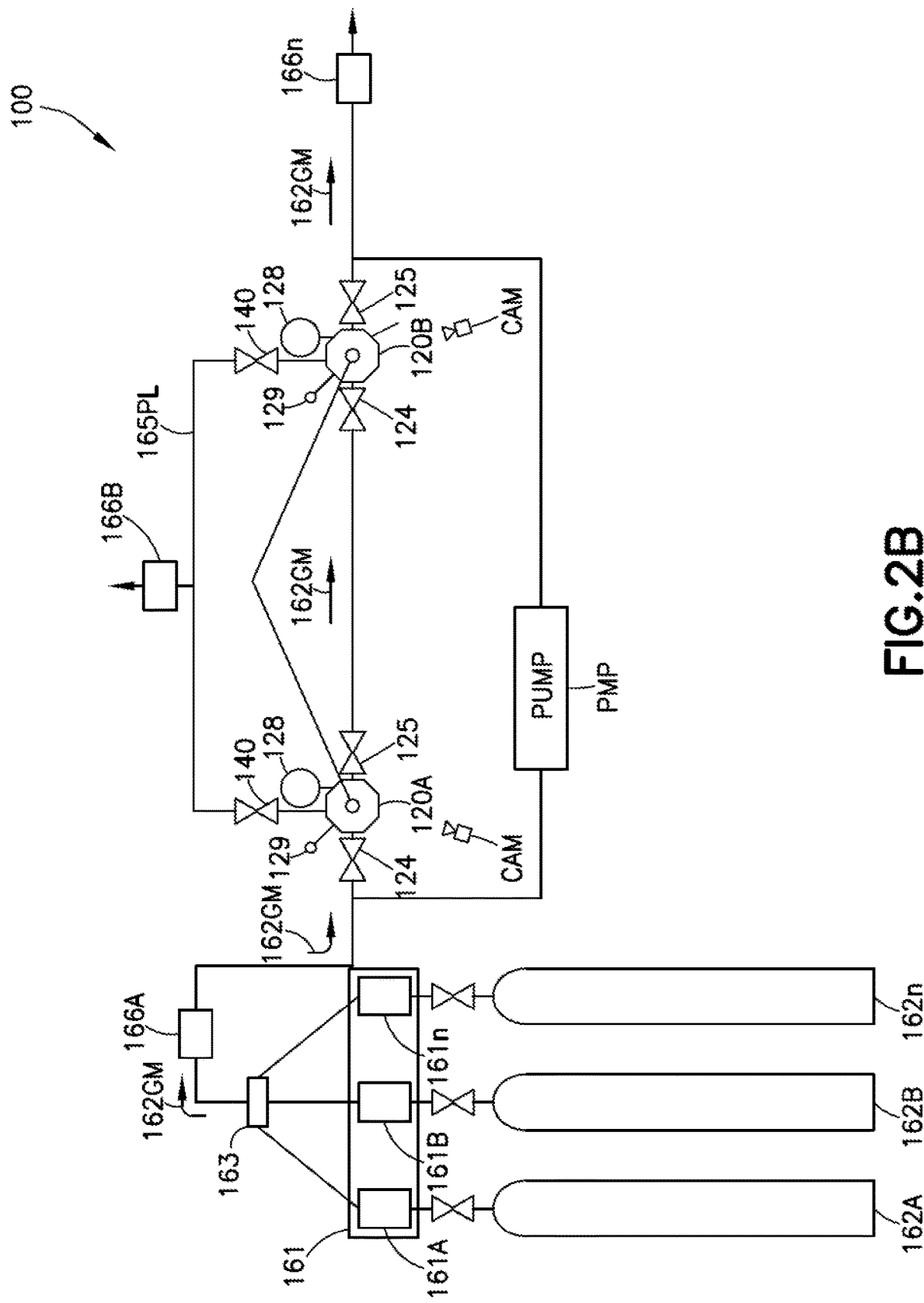
Figure 3:
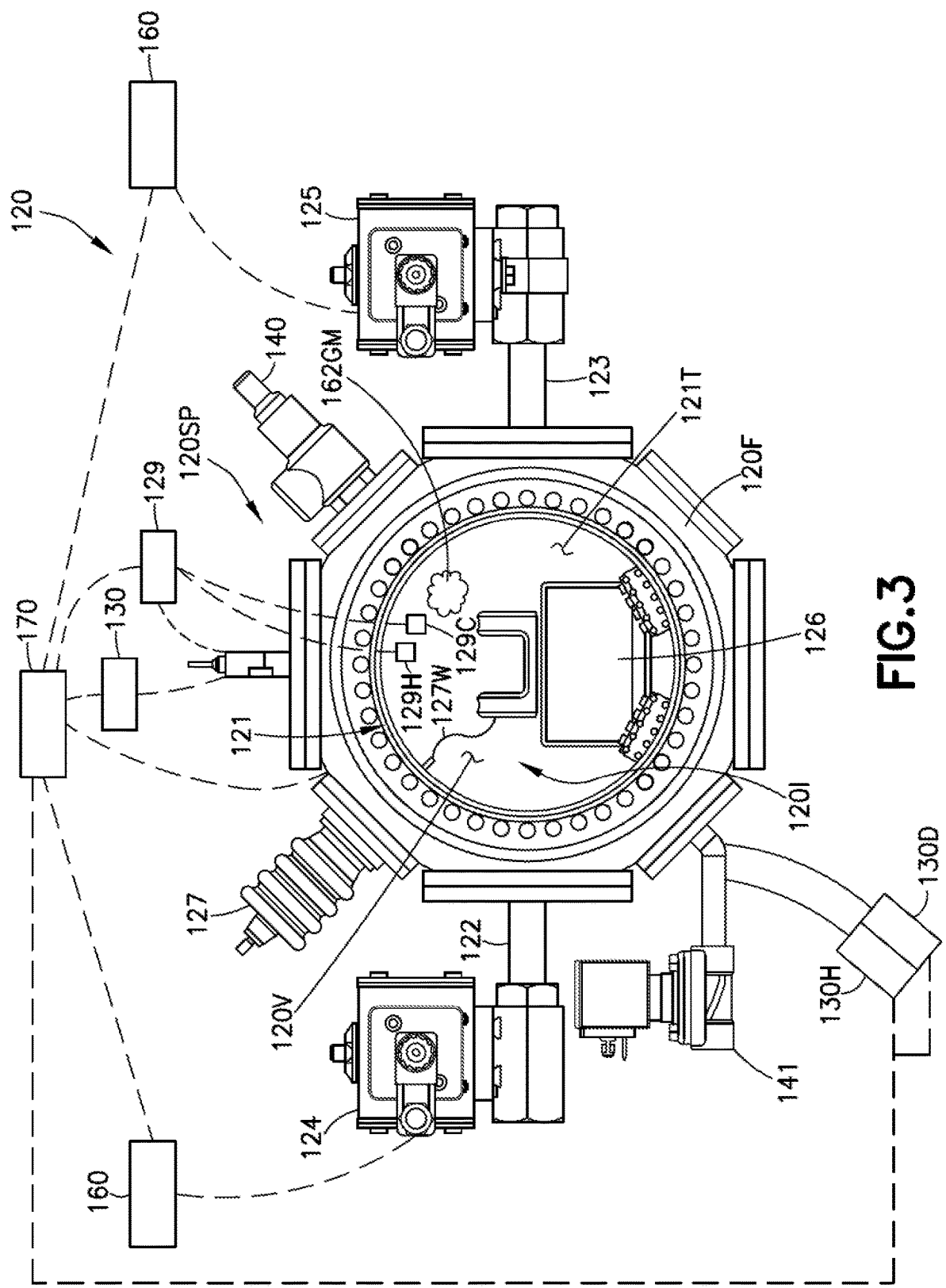
Figure 4:
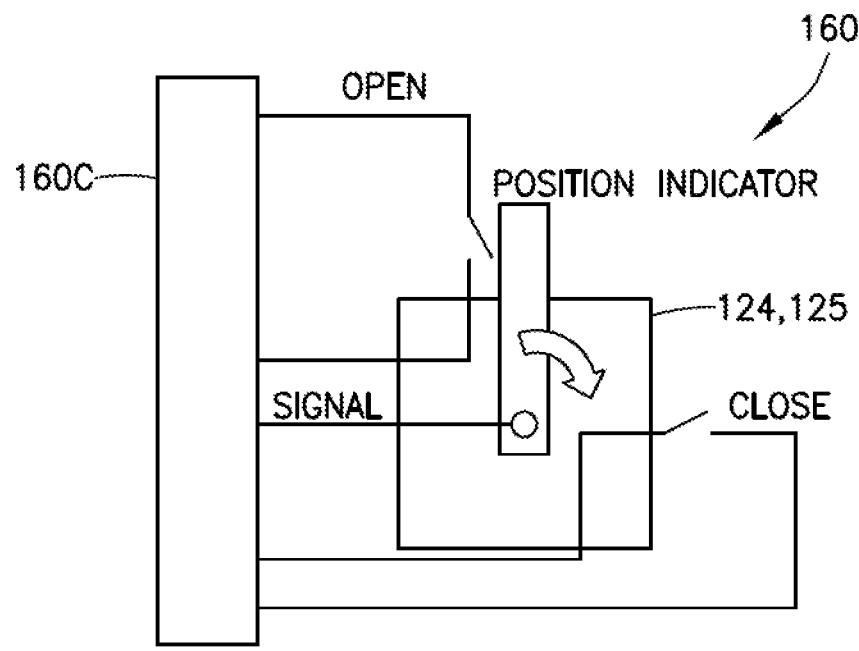
Figure 5:
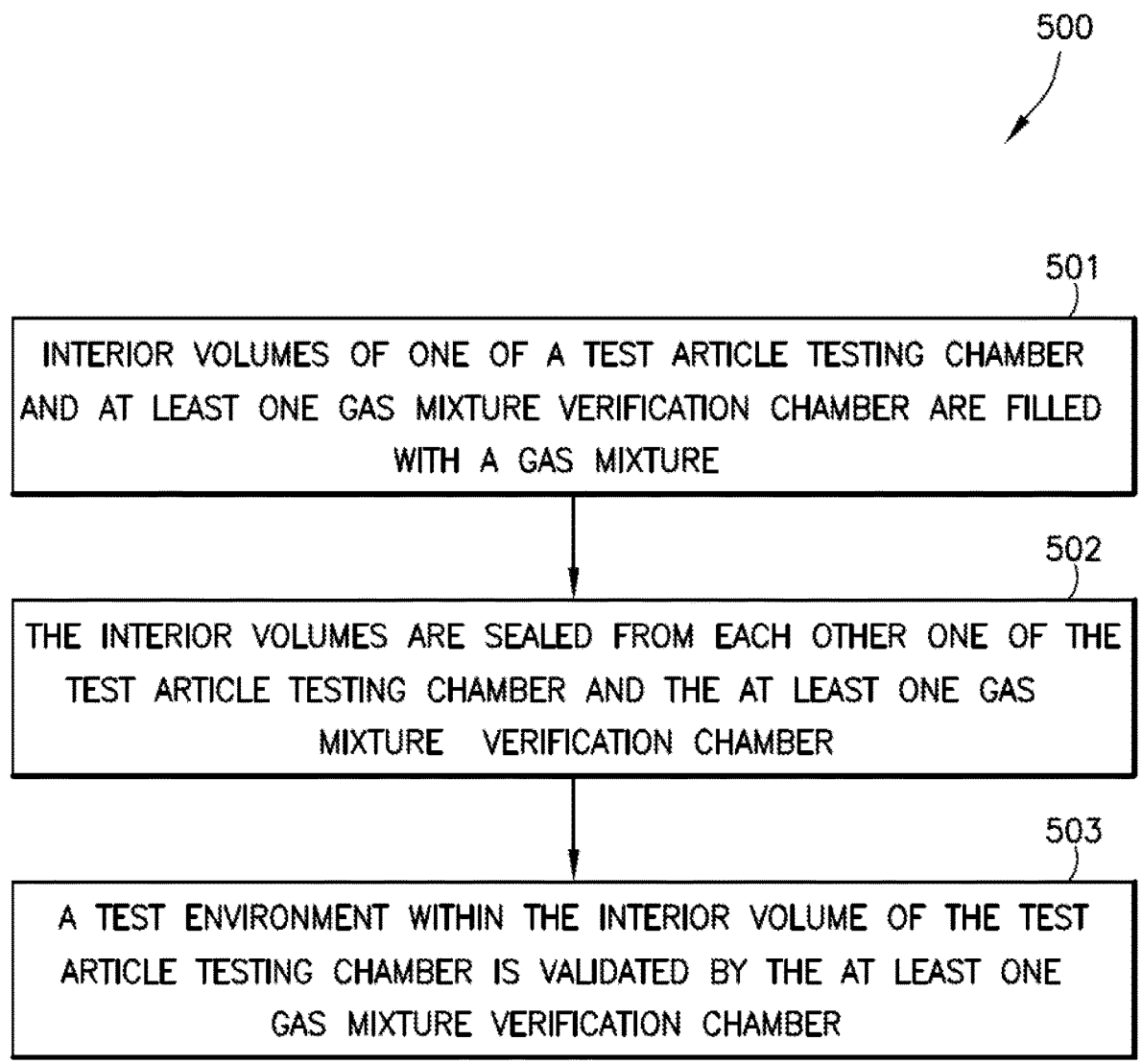
Figure 6:
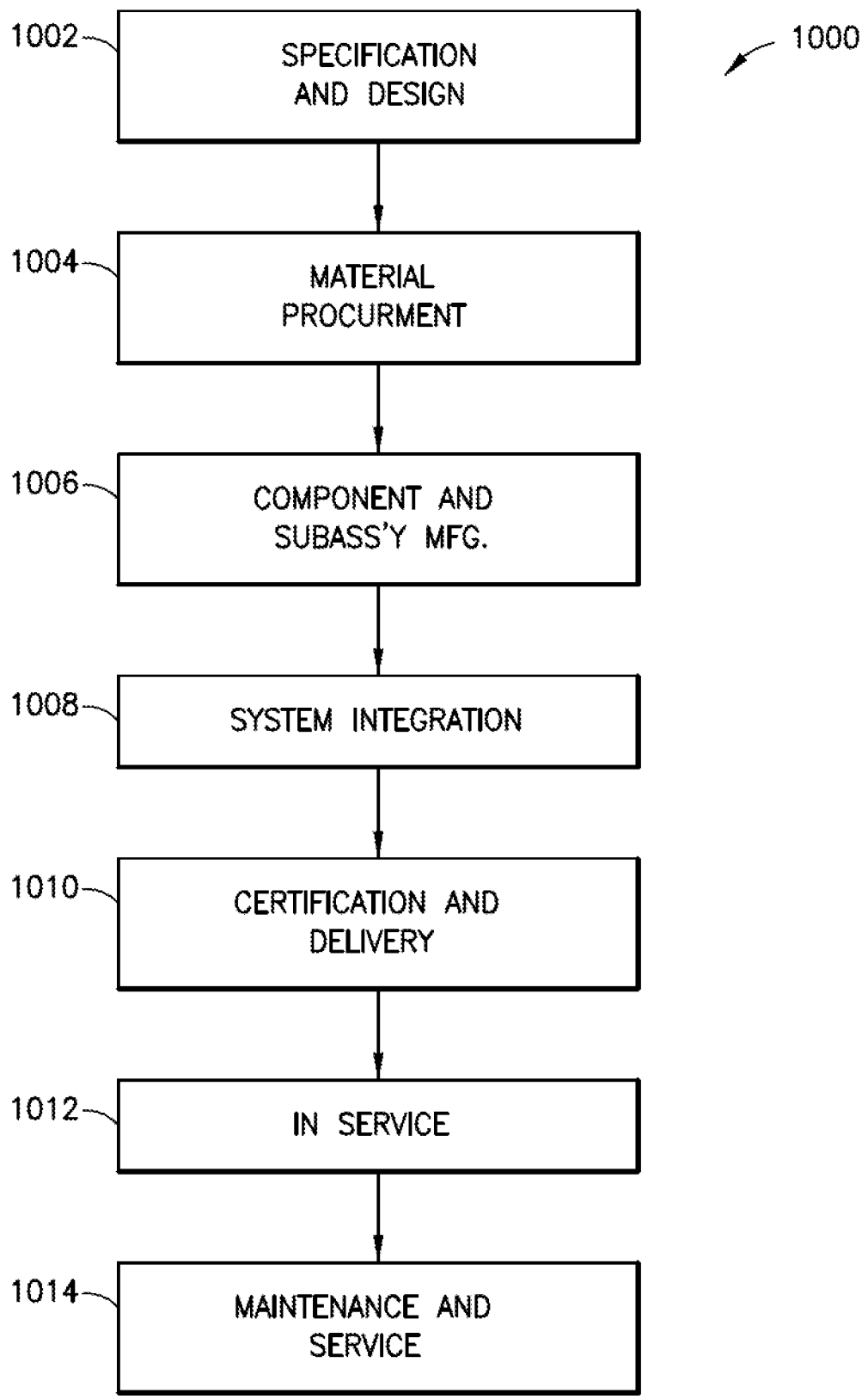
Figure 7:
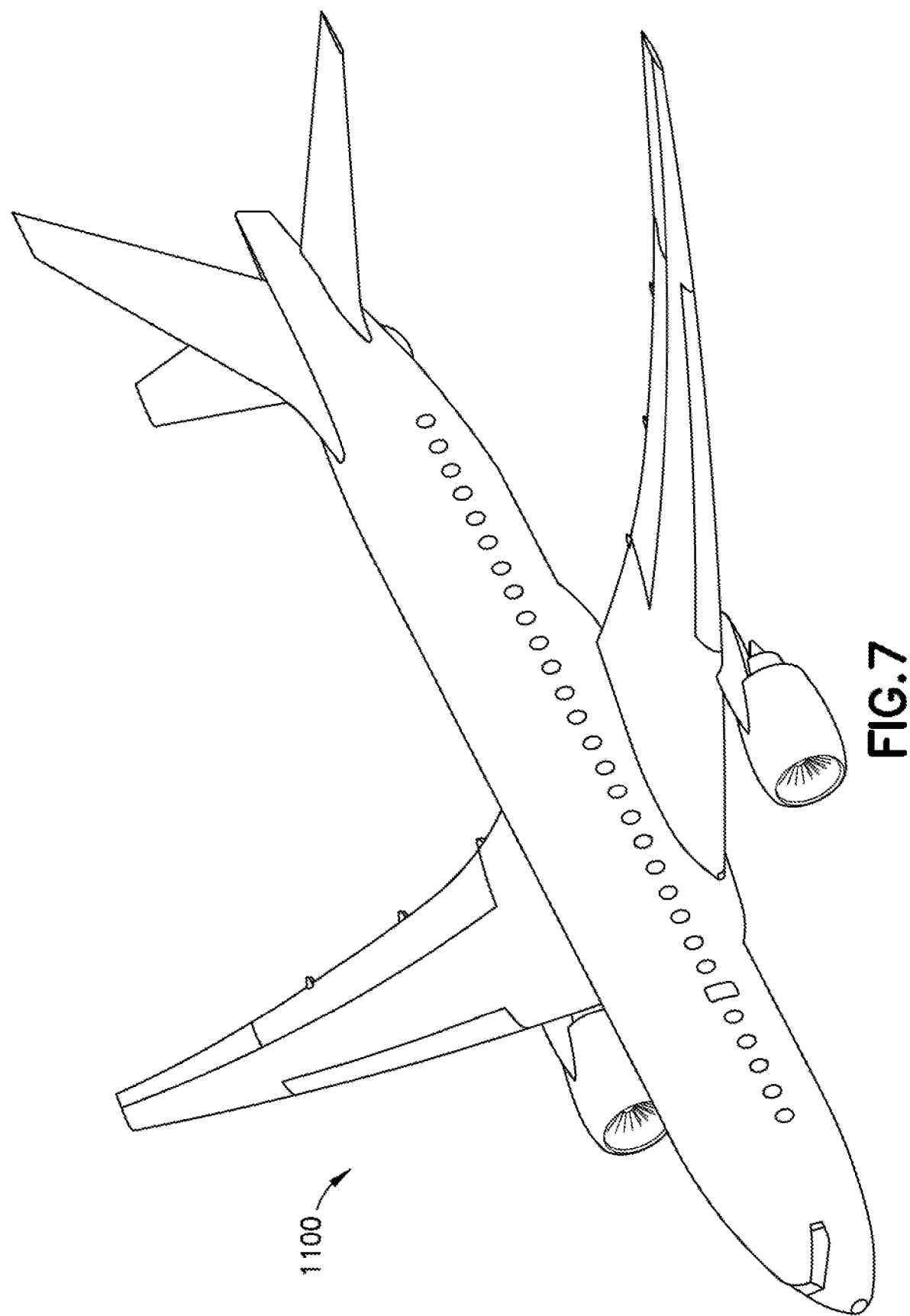

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of an ignition testing system in accordance with one or more aspects of the present disclosure;

FIG. 2A is a schematic diagram of the ignition testing system of FIG. 1 in a first configuration for testing in accordance with one or more aspects of the present disclosure;

FIG. 2B is a schematic diagram of the ignition testing system of FIG. 1 in a second configuration for calibration in accordance with one or more aspects of the present disclosure;

FIG. 3 is a schematic illustration of a portion of the ignition testing system of FIG. 1 in accordance with one or more aspects of the present disclosure;

FIG. 4 is a schematic diagram of a portion of the ignition testing system of FIG. 1 in accordance with one or more aspects of the present disclosure;

FIG. 5 is a method for ignition testing with the ignition testing system of FIG. 1 in accordance with one or more aspects of the present disclosure;

FIG. 6 is a flow chart of an aircraft production and service methodology; and FIG. 7 is a schematic illustration of an aircraft in accordance with one or more aspects of the present disclosure.

DETAILED DESCRIPTION

Referring to FIG. 1, the aspects of the present disclosure described herein provide for an ignition testing system 100 for verification of test environment characteristics, such as a content of a gas mixture 162GM, within at least an interior volume 110V of a test article testing chamber 110. As will be described herein, the ignition testing system 100 is configured to verify the content of the gas mixture 162GM of the test environment TE (e.g., the environment within at least the test article testing chamber 110) upstream and/or downstream (where upstream and downstream refer to the direction of gas flow through the ignition testing system 100 as shown in FIGS. 2A and 2B) of the test article testing chamber 110. For example, the ignition testing system 100 may verify whether the gas mixture 162GM entering/exiting the test article testing chamber 110 is flammable prior to testing a test article 900 disposed within the test article testing chamber 110. Verifying the flammability of the gas mixture 162GM before testing the test article 900 within the test article testing chamber 110 may reduce false failures associated with the conventional methods described herein and may increase frequency of testing. Illustrative, non-exhaustive examples, which may or may not be claimed, of the subject matter according to the present disclosure are provided below.

Referring now to FIGS. 1, 2A-2B, and 3, in one aspect, the ignition testing system 100 includes the test article testing chamber 110 and at least one gas mixture verification chamber 120 (generally referred to as gas mixture verification chamber 120 in FIG. 3; see also gas mixture verification chambers 120A, 120B which are substantially similar to gas mixture verification chamber 120) which is configured to communicably couple to the test article testing chamber 110. In one aspect, the ignition testing system 100 further includes at least one mass flow controller 161A-161n (generally referred to as mass flow controller 161 in FIG. 1), a gas mixing chamber 163, a pulser 164, a vent hood 165, at least one flame arrestor 166A-166n (FIGS. 2A and 2B), a lock out module 160 (FIG. 3), and a controller 170 (FIG. 3). It is noted that the components of the ignition testing system 100 are communicably coupled with any suitable conduit as shown in FIGS. 1 and 2A-2B.

The at least one gas mixture verification chamber 120 is provided to verify the test environment TE of the interior volume 110V of the test article testing chamber 110. The test environment TE includes the gas mixture 162GM provided for testing the test article 900 in the test article testing chamber 110. In one aspect, the at least one gas mixture verification chamber 120 includes a first gas mixture verification chamber 120A and a second gas mixture verification chamber 120B. One of the first and second gas mixture verification chambers 120A, 120B being disposed upstream from the test article testing chamber 110 and another one of the first and second gas mixture verification chambers 120A, 120B being disposed downstream from the test article testing chamber 110. For example, the first gas mixture verification chamber 120A may be communicably coupled to the test article testing chamber 110 upstream from the test article testing chamber 110. Here, the first gas mixture verification chamber 120A is employed for verifying the gas mixture 162GM upstream from the test article testing chamber 110. The second gas mixture verification chamber 120B may be communicably coupled to the test article testing chamber 110 downstream from the test article testing chamber 110. Here, the second gas mixture verification chamber 120B is employed for verifying the gas mixture 162GM downstream from the test article testing chamber 110. In another aspect, the ignition testing system 100 may include a single gas mixture verification chamber 120 disposed either upstream or downstream of the test article testing chamber 110.

It is noted that each of the gas mixture verification chambers 120, 120A, 120B are substantially similar as described herein, thus, the second gas mixture verification chamber 120B may be disposed upstream and the first gas mixture verification chamber 120A may be disposed downstream of the test article testing chamber 110 resulting in little to no operational difference in the ignition testing system 100. Further, it is noted that while the at least one gas mixture verification chamber 120 is illustrated and described as being two gas mixture verification chambers, in other aspects, there may be any suitable number of gas mixture verification chambers such as more or less than two.

In one aspect, the at least one gas mixture verification chamber 120 and the test article testing chamber 110 are coupled to a frame 100F. In one aspect, the frame 100F is an optical table but, in other aspects the frame 100F may be any other suitable frame configured to secure the test article testing chamber 110 and the at least one gas mixture verification chamber 120 during testing of the test article 900 and/or verification of the test environment TE of the test article testing chamber 110. In one aspect, the test article testing chamber 110 is removably coupled to the frame 100F and the at least one gas mixture verification chamber 120 so that the test article testing chamber 110 may be removed and replaced with another test article testing chamber to substantially reduce down time between each test performed.

In one aspect, the controller 170 is coupled to at least one or more of the test article testing chamber 110 and the at least one gas mixture verification chamber 120. The controller 170 is configured to effect operation of the ignition testing system 100 as described herein.

Referring to FIGS. 2A-2B and 3, in one aspect, the at least one gas mixture verification chamber 120 includes a chamber frame 120F, a gas mixture inlet 122, and a gas mixture outlet 123. A first valve 124 and a second valve 125 are coupled to a respective one of the gas mixture inlet 122 and gas mixture outlet 123. In one aspect, the at least one gas mixture verification chamber 120 also includes one or more of a voltage arc source 126, a high voltage feedthrough 127, a pressure sensor 128, a thermocouple 129, a humidity sensor 130, a pressure relief 140, and a purge gas inlet 141.

The chamber frame 120F of the at least one gas mixture verification chamber 120 forms a sealed interior 120I having an interior volume 120V within which the gas mixture 162GM is received. In one aspect, the chamber frame 120F of the at least one gas mixture verification chamber 120 includes at least one aperture 121, and a transparent member 121T configured to seal the at least one aperture 121. The at least one aperture 121 and transparent member 121T provides for an operator and/or camera to view the sealed interior 120I of the chamber frame 120F of the at least one gas mixture verification chamber 120 for visual verification of the flammability of the content of the gas mixture 162GM. In one aspect, the transparent member 121T may be omitted and replaced with an opaque (non-see through) member. In one aspect, the chamber frame 120F of the at least one gas mixture verification chamber 120 further includes at least one sensor port 120SP. The at least one sensor port 120SP of the chamber frame 120F of the at least one gas mixture verification chamber 120 is in communication with the sealed interior 120I of the chamber frame 120F. In one aspect, the at least one sensor port 120SP is configured to couple with at least one of the pressure sensor 128, the humidity sensor 130, and the thermocouple 129 as described herein.

Referring to FIGS. 1, 2A-2B, and 3, in one aspect, the gas mixture inlet 122 and the gas mixture outlet 123 of the at least one gas mixture verification chamber 120 are defined by the chamber frame 120F and are in communication with the sealed interior 120I of the chamber frame 120F. The gas mixture inlet 122 and the gas mixture outlet 123 are configured such that the gas mixture 162GM flows through the gas mixture inlet 122 into the sealed interior 120I and flows out of the sealed interior 120I through the gas mixture outlet 123. For example, in one aspect, the gas mixture inlet 122 of the first gas mixture verification chamber 120A is configured so that the gas mixture 162GM is received from one or more gas sources 162A-162n and flows through the gas mixture inlet 122 into the sealed interior 120I of the first gas mixture verification chamber 120A. The gas mixture outlet 123 of the first gas mixture verification chamber 120A is configured to couple to the test article testing chamber 110 so that the gas mixture 162GM flows from the first gas mixture verification chamber 120A to the test article testing chamber 110. The gas mixture inlet 122 of the second gas mixture verification chamber 120B is configured to couple to the test article testing chamber 110 to receive the gas mixture 162GM from the test article testing chamber 110 into the sealed interior 120I of the second gas mixture verification chamber 120B. The gas mixture outlet 123 of the second gas mixture verification chamber 120B is configured to exhaust the gas mixture 162GM from the sealed interior 120I of the second gas mixture verification chamber 120B to any suitable location such as the vent hood 165. Here, the test article testing chamber 110 is removably coupled to the gas mixture inlet 122 of the and second gas mixture verification chamber 120B and the gas mixture outlet 123 of the first gas mixture verification chambers 120A, for example, with a quick-connect coupling or any other suitable coupling.

Still referring to FIGS. 1, 2A-2B, and 3, in one aspect, the first valve 124 of the at least one gas mixture verification chamber 120 is coupled to the gas mixture inlet 122 and second valve 125 is coupled to the gas mixture outlet 123. The first valve 124 and the second valve 125 are configured to seal/unseal the respective gas mixture inlet 122 and the gas mixture outlet 123 of the at least one gas mixture verification chamber 120. For example, the first valve 124 and the second valve 125 may be a ball valve, butterfly valve, gate valve, plug valve, needle valve, or any other suitable valve (including combinations thereof). In one aspect, the first valve 124 and the second valve 125 of the at least one gas mixture verification chamber 120 may be remotely operated in any suitable manner, such as under control of the controller 170. The first valve 124 and the second valve 125 being remotely operated may provide for the operator to activate the first valve 124 and/or the second valve 125 from a distance, without physical contact with the first valve 124 and/or the second valve 125. In other aspects, the valves may be manually operated.

Referring now also to FIG. 4, in one aspect, as noted above, the ignition testing system 100 includes the lock out module 160. The lock out module 160 is coupled to the first valve 124 and/or the second valve 125 of a respective gas mixture verification chamber 120. The lock out module 160 is also coupled to the controller 170 and is configured to prevent operation of the respective gas mixture verification chamber 120 depending on, for example, an operational position of the first valve 124 and the second valve 125. The lock out module 160 includes circuitry 160C (exemplary circuitry is illustrated in FIG. 4 and it should be understood that any suitable circuit may be used to effect lock out) that is coupled to the controller 170 so that discharging of the voltage arc source 126 is prevented, until predetermined conditions are met (e.g., the first valve 124 and the second valve 125 of the respective gas mixture verification chamber 120 are in a closed position as illustrated by the truth table provided for exemplary illustration of operation of the lock out module 160). For example, the voltage arc source 126 may be coupled to the controller 170 so that when an operator commands the controller 170 to discharge the voltage arc source 126, an ignition signal is sent from the controller 170 to the voltage arc source 126. In response to the ignition signal, the voltage arc source 126 operates to ignite the gas mixture 162GM. The lock out module 160 is configured to prevent operation of the voltage arc source 126. For example, if the controller 170 does not receive a signal from the lock out module 160 that the predetermined conditions are satisfied, the controller 170 may not generate the ignition signal.

Referring to FIG. 3, the voltage arc source 126 is disposed within the sealed interior 120I of the at least one gas mixture verification chamber 120. In one aspect, the voltage arc source 126 may be a spark generator while, in other aspects, the gas mixture 162GM may be ignited by any other suitable source such as with glow plugs, wire heaters, etc. which may be coupled to the high voltage feedthrough 127. In one aspect, the voltage arc source 126 is disposed between the gas mixture inlet 122 and the gas mixture outlet 123 so as to generate turbulent gas flow through the sealed interior 120I of the at least one gas mixture verification chamber 120. This turbulent gas flow may cause a mixing of the gas mixture 162GM within the at least one gas mixture verification chambers 120.

The high voltage feedthrough 127 extends through the chamber frame 120F of the at least one gas mixture verification chamber 120 and is coupled to the voltage arc source 126. For example, any suitable wire or cable 127W may extend from the high voltage feedthrough 127 to the voltage arc source 126 to provide electrical power to the voltage arc source 126. The high voltage feedthrough 127 provides the voltage arc source 126 with electrical power so that the voltage arc source 126 can ignite the gas mixture 162GM within the sealed interior 120I.

Still referring to FIGS. 1, 2A-2B, and 3, as noted above, in one aspect, the chamber frame 120F of the at least one gas mixture verification chamber 120 includes the at least one sensor port 120SP. In this aspect, the pressure sensor 128, the humidity sensor 130 and/or the thermocouple 129 may be coupled to the at least one sensor port 120SP in any suitable manner. The pressure sensor 128 provides the operator with a measurement of the pressure inside the sealed interior 120I of the at least one gas mixture verification chamber 120 so that the operator may determine whether ignition of the gas mixture 162GM occurred. For example, a spike (e.g., large increase in pressure over a short period of time) in pressure inside the sealed interior 120I may indicate that ignition of the gas mixture 162GM has occurred. The thermocouple 129 provides the operator with a measurement of the temperature inside the sealed interior 120I of the at least one gas mixture verification chamber 120 so that the operator may determine whether ignition of the gas mixture 162GM occurred. For example, a spike (e.g., large increase in temperature over a short period of time) in temperature inside the sealed interior 120I may indicate that ignition of the gas mixture 162GM has occurred. The at least one gas mixture verification chamber 120 may include one or more of a heater 129H and a cooler 129C, where the heater 129H and the cooler 129C are coupled to the controller 170. The heater 129H is configured to increase the temperature within the sealed interior 120I of the at least one gas mixture verification chamber 120. The cooler 129C is configured to decrease the temperature within the sealed interior 120I of the at least one gas mixture verification chamber 120. The humidity sensor 130 provides the operator or controller 170 with a measurement of the humidity inside the sealed interior 120I of the at least one gas mixture verification chamber 120. The at least one gas mixture verification chamber 120 may include one or more of a humidifier 130H and a dehumidifier 130D coupled to the at least one gas mixture verification chamber 120 so as to be in fluid communication with the sealed interior 120I. The humidifier 130H and the dehumidifier 130D are coupled to the controller 170. The humidifier 130H is configured to increase the humidity within the sealed interior 120I and the dehumidifier 130D is configured to decrease the humidity within the sealed interior 120I.

In one aspect, the test article testing chamber 110 may also include humidity sensor 130' and/or thermocouple 129' and a respective heater 129H', cooler 129C', humidifier 130H', and dehumidifier 130D'. The thermocouple 129' provides the operator or controller 170 with a measurement of the temperature inside the interior volume 110V of the test article testing chamber 110. The heater 129H' and the cooler 129C' are coupled to the controller 170 and disposed within the test article testing chamber 110. The heater 129H' is configured to increase the temperature within the interior volume 110V of the test article testing chamber 110. The cooler 129C' is configured to decrease the temperature within the interior volume 110V of the test article testing chamber 110. The humidity sensor 130' provides the operator or controller 170 with a measurement of the humidity inside the interior volume 110V of the test article testing chamber 110. The humidifier 130H' and the dehumidifier 130D' are coupled to the controller 170 and further coupled to the test article testing chamber 110 so as to be in fluid communication with the interior volume 110V. The humidifier 130H' is configured to increase the humidity within the interior volume 110V and the dehumidifier 130D' is configured to decrease the humidity within the interior volume 110V.

Each of the humidity sensor 130, 130' and/or the thermocouple 129, 129' of a respective one of the at least one gas mixture verification chamber 120 and the test article testing chamber 110 may be coupled to the controller 170 so that the controller 170 receives respective temperature and humidity signals from each sensor. The controller 170 may be configured to control one or more of the heater 129H, 129H', the cooler 129C, 129C', the humidifier 130H, 130H', and the dehumidifier 130D, 130D' to control the humidity and/or the temperature within one or more of the sealed interior 120I and the interior volume 110V. For example, the controller 170 is configured to increase/decrease, with the one or more of the heater 129H, 129H' and the cooler 129C, 129C', the temperature within the sealed interior 120I and/or the interior volume 110V based on the temperature signals received from the thermocouple 129, 129'. Controlling the temperature may provide for a uniform and repeatable test environment within the sealed interior 120I and/or the interior volume 110V between each test performed. Further, controlling the temperature with the one or more of the heater 129H, 129H' and the cooler 129C, 129C' may provide for testing of the gas mixture 162GM to be performed at non-ambient temperature conditions, e.g., as low as about negative 60 degrees Fahrenheit, as high as about 200 degrees Fahrenheit, or any other suitable temperature less than about negative 60 degrees Fahrenheit, greater than about 200 degrees Fahrenheit, or any temperature therebetween. In another example, the controller 170 may be coupled to the humidity sensor 130, 130' and be configured to increase/decrease, with the one or more of the humidifier 130H, 130H' and the dehumidifier 130D, 130D', the humidity within the sealed interior 120I and/or the interior volume 110V based on the humidity signals received from the humidity sensor 130, 130'. In one aspect, the temperature and/or humidity within the test article testing chamber 110 and each of the at least one gas mixture verification chamber 120 may be individually and automatically controlled by the controller 170 based on the thermocouple 129, 129' and/or humidity sensor 130, 130' signals and a predetermined preset temperature and/or humidity (e.g., an operator may enter a predetermined temperature and/or humidity into the controller 170 where the controller 170 operates the heaters 129H, 129H'/coolers 129C, 129C' and/or humidifiers 130H, 130H'/dehumidifiers 130D, 130D' to maintain the predetermined preset temperature). In other aspects, the operator may manually control the heaters 129H, 129H'/coolers 129C, 129C' and/or humidifiers 130H, 130H'/dehumidifiers 130D, 130D'.

In one aspect, the at least one gas mixture verification chamber 120 includes the pressure relief 140 in communication with the sealed interior 120I of the at least one gas mixture verification chamber 120. The pressure relief 140 provides for the release of pressure in the sealed interior 120I, such as when the gas mixture 162GM is ignited within the sealed interior 120I. In other aspects, the pressure relief 140 may be omitted.

In one aspect, the at least one gas mixture verification chamber 120 includes a purge gas inlet 141 in communication with the sealed interior 120I of the at least one gas mixture verification chamber 120. The purge gas inlet 141 provides access to the sealed interior 120I for a purge gas (i.e., any suitable inert gas used for the replacement of an undesired atmosphere) to displace the interior volume 120V of the at least one gas mixture verification chamber 120. For example, before/after a test with the gas mixture 162GM, the interior volumes 110V, 120V of the test article testing chamber 110 and the at least one gas mixture verification chamber 120 are purged of any remaining gas that may affect the quality of the current/subsequent test.

Still referring to FIGS. 1, 2A-2B, and 3, as noted above, in one aspect, the ignition testing system 100 may include the at least one mass flow controller 161A-161n, the gas mixing chamber 163, the pulser 164, the vent hood 165, and the at least one flame arrestor 166A-166n. In one aspect, the at least one mass flow controller 161A-161n is coupled to one of the test article testing chamber 110 and the at least one gas mixture verification chamber 120 (e.g., depending on whether or not a gas mixture verification chamber 120 is disposed upstream of the test article testing chamber 110). The at least one mass flow controller 161A-161n is configured to meter at least one gas from the one or more gas sources 162A-162n to the one of the test article testing chamber 110 and the at least one gas mixture verification chamber 120.

In one aspect, the gas mixing chamber 163 is disposed between the at least one mass flow controller 161A-161n and the one of the test article testing chamber 110 and the at least one gas mixture verification chamber 120. In one aspect, the at least one mass flow controller 161A-161n meters the at least one gas from the one or more gas sources 162A-162n to the gas mixing chamber 163. The gas mixing chamber 163 is configured to mix the at least one gas from the one or more gas sources 162A-162n to form the gas mixture 162GM which subsequently flows to the one of the test article testing chamber 110 and at least one gas mixture verification chamber 120.

The pulser 164 is disposed adjacent the test article testing chamber 110. The pulser 164 is configured to provide a spark to the test article 900 disposed at least partially within the test article testing chamber 110 to test the incendivity of the test article 900.

The vent hood 165 is disposed adjacent one or more of the test article testing chamber 110 and the at least one gas mixture verification chamber 120. In one aspect, the vent hood 165 may be coupled to the pressure relief 140 of the at least one gas mixture verification chamber 120 with a pressure relief gas line 165PL (e.g., piping, tubing, or any other suitable conduit). The vent hood 165 is configured to vent any gasses exhausted from the at least one gas mixture verification chamber 120 and/or the test article testing chamber 110 (or any other component of the ignition testing system 100) to an outside of the facility 999 within which the ignition testing system 100 is disposed. For example, while validating the gas mixture 162GM by igniting the gas mixture 162GM, a pressure within the sealed interior 120I of the at least one gas mixture verification chamber 120 may spike. The pressure relief 140 is opened to exhaust combustion gasses through the pressure relief gas line 165PL to the vent hood 165 and out of the facility 999. Additionally, the vent hood 165 may also provide general ventilation for the facility 999.

In one aspect, the at least one flame arrestor 166A-166n is disposed upstream and/or downstream one or more of the test article testing chamber 110 and the at least one gas mixture verification chamber 120. For example, the at least one flame arrestor 166A-166n may be disposed on the pressure relief gas line 165PL (see flame arrestor 166B), between the mixing chamber 163 and the one of the test article testing chamber 110 and the at least one gas mixture verification chamber 120 (see flame arrestor 166A), and/or downstream of the test article testing chamber 110 and/or gas mixture verification chamber 120B (see flame arrestor 166n). The flame arrestor 166A-166n is configured to provide a passage for the gas mixture 162GM to pass through but substantially limits passage of a flame, providing an extinguishing barrier to an ignited gas mixture.

Referring now to FIGS. 1-3 and 5, a method 500 for ignition testing with the ignition testing system 100 is illustrated. In one aspect, the test article testing chamber 110 and the at least one gas mixture verification chamber 120 coupled to the frame 100F are disposed in the facility 999 adjacent the pulser 164 and the vent hood 165.

In one aspect, the ignition testing system 100 is calibrated in a calibration configuration (e.g., with the test article testing chamber 110 removed) as seen in FIG. 2B. For example, in the calibration configuration, the first and second gas mixture verification chambers 120A, 120B may be substantially directly coupled to each other. Here a content of the gas mixture 162GM may be established by adjusting the mass flow controller 161. Any suitable recording devices, such as cameras CAM or other video/acoustical recording device may also be calibrated by operating the at least one gas mixture verification chamber 120 (e.g., one or more of the first and second gas mixture verification chambers 120A, 120B) and adjusting the exposure/sound levels of the recording device. The voltage arc source 126 may also be calibrated so that a spark with predetermined characteristics (e.g., voltage and/or current values) is generated. In other aspects, any suitable component or characteristic of the ignition testing system 100 may be calibrated with the ignition testing system 100 in the calibration configuration. In one aspect, the ignition testing system 100 may include any suitable pump PMP coupled between the mass flow controller 161 and the first gas mixture verification chamber 120A (or the test article testing chamber 110) and/or between the second gas mixture verification chamber 120B (or the test article testing chamber 110) and the vent hood 165 for, e.g., pumping the gas mixture 162GM through the ignition testing system 100. While the pump PMP is illustrated as being included with the ignition testing system 100 in the calibration configuration, the pump PMP may also be included with the ignition testing system 100 in the test configuration illustrated in FIG. 2A.

As can be seen in FIG. 2A, in the test configuration of the ignition testing system 100, the test article testing chamber 110 is communicably disposed between the first and second gas mixture verification chambers 120A, 120B (or disposed upstream and/or downstream the at least one gas mixture verification chamber 120). The at least one mass flow controller 161A-161n meters the at least one gas from the one or more gas sources 162A-162n into the mixing chamber 163 to form the gas mixture 162GM. The gas mixture 162GM is metered into the interior volumes 110V, 120V of the test article testing chamber 110 and at least one gas mixture verification chamber 120 to fill the interior volumes 110V, 120V of the test article testing chamber 110 and the at least one gas mixture verification chamber 120 with the gas mixture 162GM (FIG. 5, Block 501). The gas mixture 162GM flows into each of the test article testing chamber 110 and the at least one gas mixture verification chamber 120 to purge the interior volumes 110V, 120V with the gas mixture 162GM. In one aspect, the interior volumes 110V, 120V of at least the test article testing chamber 110 and at least one gas mixture verification chamber 120 are purged so that the interior volumes 110V, 120V are displaced at least about five times. In other aspects, the interior volumes 110V, 120V may be displaced less than about five times.

After purging, the gas mixture 162GM flows between the interior volume 110V, 120V of each of the test article testing chamber 110 and the at least one gas mixture verification chamber 120, the interior volumes 110V, 120V are sealed from each other one of the test article testing chamber 110 and the at least one gas mixture verification chamber 120. (FIG. 5, Block 502). Each of the test article testing chamber 110 and the at least one gas mixture verification chamber 120 are sealed from one another by activating the first and second valve 124, 125 either remotely or manually.

With the interior volumes 110V, 120V sealed from one another, the voltage arc source 126 within the at least one gas mixture verification chamber 120 is discharged to ignite the gas mixture 162GM located within the at least one gas mixture verification chamber 120 (FIG. 5, Block 503). The gas mixture 162GM is ignited to validate the test environment within the interior volume 110V of the test article testing chamber 110. As described above, the test environment TE (e.g., the gas mixture 162GM) may be tested upstream and downstream of the test article testing chamber 110. Testing the flammability of the gas mixture 162GM upstream may verify the gas mixture flowing into the test article testing chamber 110 is flammable. Testing the flammability of the gas mixture 162GM exiting the test article testing chamber 110 may verify that the content of the gas mixture 162GM has not changed by introducing the test article 900 to the gas mixture 162GM. For example, the test article 900 may outgas (e.g., release or give off a substance as a gas or vapor as a result of the gas mixture 162GM interfacing with the test article 900) and change the content of the gas mixture 162GM to reduce the flammability of the gas mixture 162GM which may render the incendivity test of the test article 900 a failure/invalid. After validating the test environment within the at least on gas mixture verification chamber 120, the pulser 164 is activated to assess if ignition occurs within the test article testing chamber 110 for testing the incendivity of the test article 900 disposed within the test article testing chamber 110.

In one aspect, before filling the interior volumes 110V, 120V with the gas mixture 162GM, the interior volumes 110V, 120V of the test article testing chamber 110 and at least one gas mixture verification chamber 120 are purged with an inert gas to displace any gasses remaining from a previous test or after the system has been opened to the ambient environment. In one aspect, the interior volume 110V, 120V of the test article testing chamber 110 and at least one gas mixture verification chamber 120 are purged with any suitable inert gas, such as nitrogen, so that the interior volume 110V, 120V is displaced at least about two times. In one aspect, the interior volumes 110V, 120V may be displaced less than about two times.

In one aspect, the interior volumes 110V, 120V of the test article testing chamber and at least one gas mixture verification chamber 120 are provided with a dry air supply. In one aspect, drying the interior volume 110V, 120V of the test article testing chamber 110 and at least one gas mixture verification chamber 120 includes flowing dry air through the interior volume 110V, 120V for at least about five minutes (or in other aspects, less than about five minutes). The dry air is provided by a refrigeration air dryer, a desiccant air dryer, a membrane air dryer, or any other suitable dryer. The dry air supply is configured to clean the voltage arc source 126 and lower the humidity within the system prior to or after the purge with the inert gas.

Examples of the present disclosure may be described in the context of aircraft manufacturing and service method 1000 as shown in FIG. 6. In other aspects, the examples of the present disclosure may be applied in any suitable industry, such as e.g., automotive, maritime, aerospace, etc. With respect to aircraft manufacturing, during pre-production, illustrative method 1000 may include specification and design (block 1002) of aircraft 1100 (FIG. 7) and material procurement (block 1004). During production, component and subassembly manufacturing (block 1006) and system integration (block 1008) of aircraft 1100 may take place. Thereafter, aircraft 1100 may go through certification and delivery (block 1010) to be placed in service (block 1012). While in service, aircraft 1100 may be scheduled for routine maintenance and service (block 1014). Routine maintenance and service may include modification, reconfiguration, refurbishment, etc. of one or more systems of aircraft 1100 which may include use of the ignition testing system 100 as described herein.

Each of the processes of illustrative method 1000 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 1000. For example, components or subassemblies corresponding to component and subassembly manufacturing (block 1006) may be fabricated or manufactured in a manner similar to components or subassemblies produced while aircraft 1400 is in service (block 1012). Also, one or more examples of the apparatus (es), method(s), or combination thereof may be utilized during production stages 1006 and 1008, for example, by substantially expediting assembly of or reducing the cost of aircraft 1100. Similarly, one or more examples of the apparatus or method realizations, or a combination thereof, may be utilized, for example and without limitation, while aircraft 1100 is in service (block 1012) and/or during maintenance and service (block 1014).

The following are provided in accordance with the aspects of the present disclosure:

A1. An ignition testing system comprising:
a test article testing chamber; and
at least one gas mixture verification chamber being communicably coupled to the test article testing chamber and being configured to verify at least a content of a gas mixture content provided to the test article testing chamber.

A2. The ignition testing system of paragraph A1, wherein the at least one gas mixture verification chamber comprises:
a chamber frame forming a sealed interior, where the chamber frame includes at least one aperture; and
a transparent member configured to seal the at least one aperture.

A3. The ignition testing system of paragraph A1, further comprising a voltage arc source disposed within a sealed interior of the at least one gas mixture verification chamber.

A4. The ignition testing system of paragraph A3, wherein the at least one gas mixture verification chamber comprises a high voltage feedthrough extending through a chamber frame of the at least one gas mixture verification chamber, the high voltage feedthrough being coupled to the voltage arc source.

A5. The ignition testing system of paragraph A1, further comprising a pressure sensor, where the at least one gas mixture verification chamber includes a chamber frame having at least one sensor port in communication with a sealed interior of the chamber frame, the pressure sensor being coupled to the at least one sensor port.

A6. The ignition testing system of paragraph A1, further comprising a thermocouple, where the at least one gas mixture verification chamber includes a chamber frame having at least one sensor port in communication with a sealed interior of the chamber frame, the thermocouple being coupled to the at least one sensor port.

A7. The ignition testing system of paragraph A1, further comprising a pressure relief in communication with a sealed interior of the at least one gas mixture verification chamber.

A8. The ignition testing system of paragraph A1, further comprising:
a gas mixture inlet in communication with a sealed interior of the at least one gas mixture verification chamber;
a gas mixture outlet in communication with the sealed interior of the at least one gas mixture verification chamber;
a first valve coupled to the gas mixture inlet, the first valve being configured to seal the gas mixture inlet; and
a second valve coupled to the gas mixture outlet, the second valve being configured to seal the gas mixture outlet.

A9. The ignition testing system of paragraph A8, wherein the test article testing chamber is removably coupled to one of the gas mixture inlet and the gas mixture outlet through a respective one of the first valve and the second valve.

A10. The ignition testing system of paragraph A9, wherein the test article testing chamber is removably coupled to the one of the gas mixture inlet and the gas mixture outlet with a quick-connect coupling.

A11. The ignition testing system of paragraph A8, wherein the first valve and the second valve are remotely operated valves.

A12. The ignition testing system of paragraph A8, further comprising a lock out module coupled to the first valve and the second valve, the lock out module being configured to prevent operation of the at least one gas mixture verification chamber depending on an operational position of the first valve and the second valve.

A13. The ignition testing system of paragraph A8, further comprising a voltage arc source disposed within the sealed interior of the at least one gas mixture verification chamber, the voltage arc source being disposed between the gas mixture inlet and the gas mixture outlet so as to generate turbulent gas flow through the sealed interior.

A14. The ignition testing system of paragraph A1, further comprising at least one mass flow controller coupled to one of the test article testing chamber and the at least one gas mixture verification chamber, the at least one mass flow controller being configured to meter at least one gas into the one of the test article testing chamber and the at least one gas mixture verification chamber.

A15. The ignition testing system of paragraph A14, further comprising a gas mixing chamber disposed between the at least one mass flow controller and the one of the test article testing chamber and the at least one gas mixture verification chamber.

A16. The ignition testing system of paragraph A1, wherein the at least one gas mixture verification chamber further comprises a purge gas inlet in communication with a sealed interior of the at least one gas mixture verification chamber.

A17. The ignition testing system of paragraph A1, further comprising a pulser disposed adjacent the test article testing chamber.

A18. The ignition testing system of paragraph A1, further comprising a vent hood disposed adjacent one or more of the test article testing chamber and the at least one gas mixture verification chamber.

A19. The ignition testing system of paragraph A1, further comprising at least one flame arrestor disposed upstream one or more of the test article testing chamber and the at least one gas mixture verification chamber.

A20. The ignition testing system of paragraph A1, further comprising at least one flame arrestor disposed downstream one or more of the test article testing chamber and the at least one gas mixture verification chamber.

A21. The ignition testing system of paragraph A1, further comprising a controller coupled to one or more of the test article testing chamber and the at least one gas mixture verification chamber, the controller being configured to effect operation of the ignition testing system.

A22. The ignition testing system of paragraph A1, wherein one or more of the test article testing chamber and the at least one gas mixture verification chamber includes at least one of a heater, a cooler, a humidifier, and a dehumidifier.

B1. An ignition testing system comprising:
a test article testing chamber;
a first gas mixture verification chamber being communicably coupled to the test article testing chamber to provide a gas mixture to the test article testing chamber;
a second gas mixture verification chamber being communicably coupled to the test article testing chamber to receive the gas mixture from the test article testing chamber; and
wherein first gas mixture verification chamber and the second gas mixture verification chamber are configured to verify a test environment within the test article testing chamber.

B2. The ignition testing system of paragraph B1, wherein each of the first gas mixture verification chamber and the second gas mixture verification chamber comprises:
a chamber frame forming a sealed interior, where the chamber frame includes at least one aperture; and
a transparent member configured to seal the at least one aperture.

B3. The ignition testing system of paragraph B1, further comprising a voltage arc source disposed within a sealed interior of each of the first gas mixture verification chamber and the second gas mixture verification chamber.

B4. The ignition testing system of paragraph B3, wherein each of the first gas mixture verification chamber and the second gas mixture verification chamber comprise a high voltage feedthrough extending through a chamber frame of a respective one of the first gas mixture verification chamber and the second gas mixture verification chamber, the high voltage feedthrough being coupled to the voltage arc source.

B5. The ignition testing system of paragraph B1, where each of the first gas mixture verification chamber and the second gas mixture verification chamber includes a chamber frame having at least one sensor port in communication with a sealed interior of the chamber frame, the ignition testing system further comprises at least one pressure sensor coupled to a respective sensor port.

B6. The ignition testing system of paragraph B1, where each of the first gas mixture verification chamber and the second gas mixture verification chamber includes a chamber frame having at least one sensor port in communication with a sealed interior of the chamber frame, the ignition testing system further comprises at least one thermocouple coupled to a respective sensor port.

B7. The ignition testing system of paragraph B1, further comprising a pressure relief in communication with a sealed interior of each of the first gas mixture verification chamber and the second gas mixture verification chamber.

B8. The ignition testing system of paragraph B1, wherein each of the first gas mixture verification chamber and the second gas mixture verification chamber comprise:
a gas mixture inlet in communication with a sealed interior of a respective one of the first gas mixture verification chamber and the second gas mixture verification chamber;
a gas mixture outlet in communication with the sealed interior of the respective one of the first gas mixture verification chamber and the second gas mixture verification chamber;
a first valve coupled to a respective gas mixture inlet, the first valve being configured to seal the respective gas mixture inlet; and
a second valve coupled to a respective gas mixture outlet, the second valve being configured to seal the respective gas mixture outlet.

B9. The ignition testing system of paragraph B8, wherein the test article testing chamber is removably coupled to the gas mixture outlet of the first gas mixture verification chamber and the gas mixture inlet of the second gas mixture verification chamber through a respective one of the first valve and the second valve.

B10. The ignition testing system of paragraph B9, wherein the test article testing chamber is removably coupled to the gas mixture inlet and the gas mixture outlet with quick-connect couplings.

B11. The ignition testing system of paragraph B8, wherein the first valve and the second valve are remotely operated valves.

B12. The ignition testing system of paragraph B8, further comprising a lock out module coupled to the first valve and the second valve of one or more of the first gas mixture verification chamber and the second gas mixture verification chamber, the lock out module being configured to prevent operation of the one or more of the first gas mixture verification chamber and the second gas mixture verification chamber depending on an operational position of the first valve and the second valve.

B13. The ignition testing system of paragraph B8, further comprising a voltage arc source disposed within the sealed interior of the each of the first gas mixture verification chamber and the second gas mixture verification chamber, the voltage arc source being disposed between the gas mixture inlet and the gas mixture outlet so as to generate turbulent gas flow through the sealed interior.

B14. The ignition testing system of paragraph B1, further comprising at least one mass flow controller coupled to one of the first gas mixture verification chamber, the at least one mass flow controller being configured to meter at least one gas into the first gas mixture verification chamber.

B15. The ignition testing chamber of paragraph B14, further comprising a gas mixing chamber disposed between the at least one mass flow controller and the first gas mixture verification chamber.

B16. The ignition testing system of paragraph B1, wherein each of the first gas mixture verification chamber and the second gas mixture verification chamber further comprise a purge gas inlet in communication with a respective sealed interior of the first gas mixture verification chamber and the second gas mixture verification chamber.

B17. The ignition testing system of paragraph B1, further comprising a pulser disposed adjacent the test article testing chamber.

B18. The ignition testing system of paragraph B1, further comprising a vent hood disposed adjacent one or more of the test article testing chamber, the first gas mixture verification chamber, and the second gas mixture verification chamber.

B19. The ignition testing system of paragraph B1, further comprising at least one flame arrestor disposed upstream one or more of the test article testing chamber, the first gas mixture verification chamber, and the second gas mixture verification chamber.

B20. The ignition testing system of paragraph B1, further comprising at least one flame arrestor disposed downstream one or more of the test article testing chamber, the first gas mixture verification chamber and the second gas mixture verification chamber.

B21. The ignition testing system of paragraph B1, further comprising a controller coupled to one or more of the test article testing chamber, the first gas mixture verification chamber, and the second gas mixture verification chamber, the controller being configured to effect operation of the ignition testing system.

B22. The ignition testing system of paragraph B1, wherein one or more of the test article testing chamber, the first gas mixture verification chamber, and the second gas mixture verification chamber includes at least one of a heater, a cooler, a humidifier, and a dehumidifier.

C1. A method for ignition testing with an ignition testing system, the method comprising:
filling an interior volume of a test article testing chamber and at least one gas mixture verification chamber with a gas mixture, where the test article testing chamber is communicably coupled to the at least one gas mixture verification chamber so that the gas mixture flows from one of the test article testing chamber and the at least one gas mixture verification chamber to another one of the test article testing chamber and the at least one gas mixture verification chamber;
sealing the interior volume of each of the test article testing chamber and the at least one gas mixture verification chamber from the interior volume of each other one of the test article testing chamber and the at least one gas mixture verification chamber; and
validating, with the at least one gas mixture verification chamber, a test environment within the test article testing chamber.

C2. The method of paragraph C1, wherein validating the test environment within the test article testing chamber comprises validating an incendivity of the gas mixture within the at least one gas mixture verification chamber.

C3. The method of paragraph C1, wherein filling the interior volume of the test article testing chamber and at least one gas mixture verification chamber with the gas mixture comprises purging the interior volume of the test article testing chamber and at least one gas mixture verification chamber with an inert gas.

C4. The method of paragraph C3, wherein purging the interior volume of the test article testing chamber and at least one gas mixture verification chamber with an inert gas comprises purging the interior volume of at least the test article testing chamber and at least one gas mixture verification chamber with nitrogen so that the interior volume is displaced at least two times.

C5. The method of paragraph C1, wherein filling the interior volume of the test article testing chamber and at least one gas mixture verification chamber with the gas mixture comprises drying the interior volume of the test article testing chamber and at least one gas mixture verification chamber.

C6. The method of paragraph C5, wherein drying the interior volume of the test article testing chamber and at least one gas mixture verification chamber comprises flowing dry air through the interior volume for at least five minutes.

C7. The method of paragraph C6, wherein the dry air is provided by a refrigeration air dryer, a desiccant air dryer or a membrane air dryer.

C8. The method of paragraph C1, wherein filling the interior volume of the test article testing chamber and at least one gas mixture verification chamber with the gas mixture comprises metering the gas mixture into the interior volume of the test article testing chamber and at least one gas mixture verification chamber.

C9. The method of paragraph C8, wherein filling the interior volume of the test article testing chamber and at least one gas mixture verification chamber with the gas mixture further comprises purging the interior volume of at least the test article testing chamber and at least one gas mixture verification chamber with the gas mixture so that the interior volume is displaced at least five times.

C10. The method of paragraph C1, wherein validating the test environment within the test article testing chamber comprises, discharging a voltage arc source in the at least one gas mixture verification chamber to verify ignition of the gas mixture.

C11. The method of paragraph C1, wherein the at least one gas mixture verification chamber comprises a first gas mixture verification chamber communicably coupled to the test article testing chamber to provide a gas mixture to the test article testing chamber, and a second gas mixture verification chamber communicably coupled to the test article testing chamber to receive the gas mixture from the test article testing chamber, and wherein validating the test environment within the test article testing chamber comprises:
discharging a voltage arc source in the first gas mixture verification chamber to verify ignition of the gas mixture within the first gas mixture verification chamber; and
discharging a voltage arc source in the second gas mixture verification chamber to verify ignition of the gas mixture within the second gas mixture verification chamber.

C12. The method of paragraph C1, further comprising activating a pulser disposed adjacent the test article testing chamber to assess if ignition occurs within the test article testing chamber.

C13. The method of paragraph C1, further comprising controlling one or more of a temperature and a humidity within one or more of the test article testing chamber and the at least one gas mixture verification chamber.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 5 and 6, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 5 and 6 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus (es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An ignition testing system comprising:
a test article testing chamber; and
at least one gas mixture verification chamber having a sealed interior being communicably coupled to the test article testing chamber so that a common gas mixture content is shared by both the test article testing chamber and the at least one gas mixture verification chamber, and the at least one gas mixture verification chamber being configured to selectively seal the sealed interior of the at least one gas mixture verification chamber from the test article testing chamber and further configured to verify within the selectively sealed interior of the at least one gas mixture verification chamber at least an incendivity of the common gas mixture content provided to the test article testing chamber.

2. The ignition testing system of claim 1, wherein the at least one gas mixture verification chamber comprises:
a chamber frame forming the sealed interior, where the chamber frame includes at least one aperture; and
a transparent member configured to seal the at least one aperture.

3. The ignition testing system of claim 1, further comprising a voltage arc source disposed within the sealed interior of the at least one gas mixture verification chamber.

4. The ignition testing system of claim 1, further comprising a pressure sensor, where the at least one gas mixture verification chamber includes a chamber frame forming the sealed interior and having at least one sensor port in communication with the sealed interior of the chamber frame, the pressure sensor being coupled to the at least one sensor port.

5. The ignition testing system of claim 1, further comprising a thermocouple, where the at least one gas mixture verification chamber includes a chamber frame forming the sealed interior and having at least one sensor port in communication with the sealed interior of the chamber frame, the thermocouple being coupled to the at least one sensor port.

6. The ignition testing system of claim 1, further comprising:
a gas mixture inlet in communication with the sealed interior of the at least one gas mixture verification chamber;
a gas mixture outlet in communication with the sealed interior of the at least one gas mixture verification chamber;
a first valve coupled to the gas mixture inlet, the first valve being configured to seal the gas mixture inlet; and
a second valve coupled to the gas mixture outlet, the second valve being configured to seal the gas mixture outlet.

7. The ignition testing system of claim 6, wherein the test article testing chamber is removably coupled to one of the gas mixture inlet and the gas mixture outlet through a respective one of the first valve and the second valve.

8. The ignition testing system of claim 6, further comprising a lock out module coupled to the first valve and the second valve, the lock out module being configured to prevent operation of the at least one gas mixture verification chamber depending on an operational position of the first valve and the second valve.

9. The ignition testing system of claim 6, further comprising a voltage arc source disposed within the sealed interior of the at least one gas mixture verification chamber, the voltage arc source being disposed between the gas mixture inlet and the gas mixture outlet so as to generate turbulent gas flow through the sealed interior.

10. An ignition testing system comprising:
a test article testing chamber;
a first gas mixture verification chamber being communicably coupled to the test article testing chamber to provide a gas mixture to the test article testing chamber;
a second gas mixture verification chamber being communicably coupled to the test article testing chamber to receive the gas mixture from the test article testing chamber; and
wherein:
first gas mixture verification chamber and the second gas mixture verification chamber are coupled to each other through the test article testing chamber to form a common environment that is common to an interior of each of the first gas mixture verification chamber, the second gas mixture verification chamber, and the test article chamber, and
the interior of the first gas mixture verification chamber and the interior of the second gas mixture verification chamber each being selectively sealed from the interior of the test article testing chamber to verify within the respective selectively sealed interior of the first gas mixture verification chamber and the second gas mixture verification chamber at least an incendivity of the gas mixture within the test article testing chamber.

11. The ignition testing system of claim 10, further comprising a pressure relief in communication with a sealed interior of each of the first gas mixture verification chamber and the second gas mixture verification chamber.

12. The ignition testing system of claim 10, wherein each of the first gas mixture verification chamber and the second gas mixture verification chamber further comprise a purge gas inlet in communication with a respective sealed interior of the first gas mixture verification chamber and the second gas mixture verification chamber.

13. The ignition testing system of claim 10, further comprising a pulser disposed adjacent the test article testing chamber.

14. The ignition testing system of claim 10, further comprising a controller coupled to one or more of the test article testing chamber, the first gas mixture verification chamber, and the second gas mixture verification chamber, the controller being configured to effect operation of the ignition testing system.

15. The ignition testing system of claim 10, wherein one or more of the test article testing chamber, the first gas mixture verification chamber, and the second gas mixture verification chamber includes at least one of a heater, a cooler, a humidifier, and a dehumidifier.

16. A method for ignition testing with an ignition testing system, the method comprising:
filling an interior volume of a test article testing chamber and at least one gas mixture verification chamber with a gas mixture, where the test article testing chamber is communicably coupled to the at least one gas mixture verification chamber so that the gas mixture flows from one of the test article testing chamber and the at least one gas mixture verification chamber to another one of the test article testing chamber and the at least one gas mixture verification chamber;
sealing the interior volume of each of the test article testing chamber and the at least one gas mixture verification chamber from the interior volume of each other one of the test article testing chamber and the at least one gas mixture verification chamber; and validating, with the at least one gas mixture verification chamber, a test environment within the test article testing chamber;

wherein validating the test environment within the test article testing chamber comprises verifying an incendivity of the gas mixture within the at least one gas mixture verification chamber.

17. The method of claim 16, wherein filling the interior volume of the test article testing chamber and at least one gas mixture verification chamber with the gas mixture comprises purging the interior volume of the test article testing chamber and at least one gas mixture verification chamber with an inert gas.

18. The method of claim 16, wherein filling the interior volume of the test article testing chamber and at least one gas mixture verification chamber with the gas mixture comprises drying the interior volume of the test article testing chamber and at least one gas mixture verification chamber.

19. The method of claim 16, wherein filling the interior volume of the test article testing chamber and at least one gas mixture verification chamber with the gas mixture further comprises purging the interior volume of at least the test article testing chamber and at least one gas mixture verification chamber with the gas mixture so that the interior volume is displaced at least five times.

20. The method of claim 16, wherein filling the at least one gas mixture verification chamber comprises a first gas mixture verification chamber communicably coupled to the test article testing chamber to provide a gas mixture to the test article testing chamber, and a second gas mixture verification chamber communicably coupled to the test article testing chamber to receive the gas mixture from the test article testing chamber, and wherein validating the test environment within the test article testing chamber comprises:

discharging a voltage arc source in the first gas mixture verification chamber to verify ignition of the gas mixture within the first gas mixture verification chamber; and discharging a voltage arc source in the second gas mixture verification chamber to verify ignition of the gas mixture within the second gas mixture verification chamber.

21. The method of claim 17, wherein purging the interior volume of the test article testing chamber and at least one gas mixture verification chamber with the inert gas comprises purging the interior volume of at least the test article testing chamber and at least one gas mixture verification chamber with the inert gas so that the interior volume is displaced at least two times.

* * * * *